US006757796B1

(12) United States Patent
Hofmann (10) Patent No.: US 6,757,796 B1
(45) Date of Patent: Jun. 29, 2004

(54) METHOD AND SYSTEM FOR CACHING STREAMING LIVE BROADCASTS TRANSMITTED OVER A NETWORK

(75) Inventor: Markus Hofmann, Fair Haven, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/571,610

(22) Filed: May 15, 2000

(51) Int. Cl.[7] .............................................. G06F 12/08
(52) U.S. Cl. ........................ 711/159; 711/118; 709/225
(58) Field of Search ................................ 711/159, 113, 711/118, 138, 137, 141; 709/226, 201, 203, 231, 225, 233, 216; 710/39, 50–59; 725/512

(56) References Cited

U.S. PATENT DOCUMENTS

| | | | | |
|---|---|---|---|---|
| 5,530,754 A | * | 6/1996 | Garfinkle ..................... | 380/211 |
| 5,586,264 A | * | 12/1996 | Belknap et al. ............. | 711/118 |
| 5,793,980 A | * | 8/1998 | Glaser et al. ............... | 370/352 |
| 5,805,804 A | * | 9/1998 | Laursen et al. ............. | 709/223 |
| 5,815,662 A | * | 9/1998 | Ong ....................... | 365/230.01 |
| 5,933,603 A | * | 8/1999 | Vahalia et al. .............. | 709/225 |
| 6,061,504 A | * | 5/2000 | Tzelnic et al. .............. | 709/203 |
| 6,101,547 A | * | 8/2000 | Mukherjee et al. ......... | 709/231 |
| 6,243,761 B1 | * | 6/2001 | Mogul et al. ............... | 709/246 |
| 6,292,834 B1 | * | 9/2001 | Ravi et al. .................. | 709/233 |
| 6,324,182 B1 | * | 11/2001 | Burns et al. ................ | 370/429 |
| 6,377,972 B1 | * | 4/2002 | Guo et al. .................. | 709/201 |
| 6,385,693 B1 | * | 5/2002 | Gerszberg et al. .......... | 711/118 |
| 6,405,256 B1 | * | 6/2002 | Lin et al. ................... | 709/231 |
| 6,415,373 B1 | * | 7/2002 | Peters et al. ................ | 711/167 |
| 6,427,187 B2 | * | 7/2002 | Malcolm ................... | 711/119 |
| 6,438,630 B1 | | 8/2002 | DeMoney ................... | 710/56 |
| 6,438,652 B1 | * | 8/2002 | Jordan et al. ............... | 711/120 |
| 6,570,606 B1 | * | 5/2003 | Sidhu et al. ................ | 348/14.1 |
| 2002/0129123 A1 | * | 9/2002 | Johnson et al. ............. | 709/219 |

FOREIGN PATENT DOCUMENTS

| EP | 001193940 A2 | * | 4/2002 | ........... H04L/29/06 |
|---|---|---|---|---|
| WO | WO 01/99374 A2 | * | 12/2001 | |

OTHER PUBLICATIONS

Handy, Jim. "The Cache Memory Book", p. 57, 1998.*
Reza Rejaie, Mark Handley, Haobo Yu, and Deobrah Estrin. "Proxy Caching Mechanism for Multimedia Playback Streams in the Internet", 4th Int'l Web Caching Workshop, pp. 1–15, Apr. 1, 1999.*
Markus Hofmann et al., "Caching techniques for Streaming Multimedia over the Internet", pp. 1–11, Bell Labs Technical Memorandum, Apr. 1999.*
Murphy, Kevin. "RealNetworks Attack the Buffer Barrier", Comtex Top Stories, pp. 1–3, Mar. 6, 2002.*
Markus Hofmann's, "Caching techniques for Streaming Multimedia over the Internet", http://hofmann.us.markus/publications.htm, pp 1–11, Apr. 1999.*
www.realnetworks.com, "TurboPlay FAQ", 2 pages, Mar. 6, 2002.*
www.realnetworks.com, "Technical Description" (of Realsystem Proxy), pp. 1–2, Mar. 7, 2002.*

* cited by examiner

*Primary Examiner*—Pierre Bataille (57) ABSTRACT

Disclosed is a method and an apparatus for enhancing existing caching systems to better support the live broadcast of streaming multimedia over the Internet and other public network systems. The apparatus includes the use of helper servers in the network for supporting high quality live streaming multimedia (SM) broadcasts. The helper servers (HS), also referred to as helpers, are each positioned in the network to be close to some number of clients. Client requests for live SM broadcast objects are re-routed from the content server to the local HS to be serviced therefrom. Servicing requests from the local HS is advantageous in that the requests are not required to be serviced from the content server as separate unicast datastreams thereby reducing network congestion problems. In addition to servicing requests locally, each HS allocates and maintains PH buffers which operate as a form of dynamic cache to further reduce the playback delay at a client. The PH buffers operate as a moving window of fixed size that advances with the live broadcast stream, storing the last few seconds of the live SM broadcast. The cached data is made immediately available to a requesting client to fill the client's playout buffer as rapidly as possible.

29 Claims, 9 Drawing Sheets

METHOD AND SYSTEM FOR CACHING STREAMING LIVE BROADCASTS TRANSMITTED OVER A NETWORK

BACKGROUND OF THE INVENTION

1. Field of the Invention

The present invention relates generally to the field of real-time multimedia applications, and more particularly, to decreasing the playback delay at a client computer of a live streaming broadcast transmitted over a network.

2. Description of the Related Art

Live broadcasting of streaming multimedia over the Internet is becoming increasingly popular. Multimedia data includes audio, textual, and graphical (including video) data. Streaming data involves sending a continuous transmission of data from the server to a client. At the client computer, received data is buffered in a cache memory and continuously processed as soon as, or soon after, being received by the client. The client computer creates a multimedia output from the received multimedia data. The advantage of streaming is that the client computer does not have to wait until all data is downloaded from the server before some of the data is processed and the multimedia output is created. One application of streaming media over the Internet is the live broadcast which is characterized by synchronous client requests (i.e., multiple clients requesting the same multimedia data at the same time). The Internet is replete with websites dedicated to streaming multimedia content to millions of clients each day, including movie broadcasts, television, sports, talk and music radio, business events, seminars, and tutorials.

Multimedia applications, such as the one described above, involve the transfer of large amounts of information, placing a considerable load on the resources of the network, server, and client. As more people access network-based multimedia applications, there will be an increased demand for longer, more complicated, more flexible multimedia applications. One proposed solution for meeting this expected demand is multicast technology scaling live broadcasts, however, it does not address the problem of start-up latency. While recent enhancements in Internet streaming technology provide the basis for the current success of live broadcasting, it still lacks important features to approach the "look and feel" of the traditional broadcast technology. As an example, consumers have become accustomed to frequent channel switching without a delay in-between. It is expected to be able to view a channel as soon as the remote control button is depressed or the TV is turned on. Fast channel switching and immediate playback become even more important in the context of Internet radio. Current streaming technology, however, is unable to provide these features. After a client selects streaming content, the client will typically experience an associated delay, typically in the range of 5 to 10 seconds, before playback starts. This same delay is experienced during channel switching.

Accordingly, there exists a need to develop improved techniques to enhance current distribution systems to provide an acceptable means for distributing live broadcasts over a public network, such as the Internet.

SUMMARY OF THE INVENTION

The present invention discloses a method and apparatus for enhancing existing caching systems to better support the live broadcast of streaming multimedia over the Internet and other public network systems.

Illustrative embodiments of the present invention present a novel architecture and method for supporting high quality live streaming multimedia (SM) broadcasts on a public network system, such as the Internet. By using helper servers (HS), also referred to as helpers, which operate as caching and streaming agents inside the network, existing caching techniques are enhanced to better support live broadcasts by reducing playback delay at a client without sacrificing perceived playback quality. The faster a client's buffer is filled, the faster playback starts. To achieve this end, in accordance with one aspect of the present invention, a playout history (PH) buffer is allocated and maintained at the HS in response to a client request for a particular live SM broadcast. The PH buffer operates as a moving window of fixed size that advances with the live broadcast stream, storing the last few seconds of the datastream. An advantage of utilizing PH buffers is that as subsequent client requests are received at the HS for a live SM broadcast which is currently being stored in a previously allocated PH buffer in response to a former request, each subsequent request can be serviced directly from the PH buffer thereby reducing start-up latency. An advantage in streaming data packets to each client is realized by virtue of having some number of them pre-stored in the PH buffer. When a request is received at the HS, the stored packets are immediately available for distribution to the requesting client.

Servicing subsequent requests from the PH buffer offers advantages over prior art methods for two reasons. First, each subsequent request is not required to be individually serviced from the content server as a unicast datastream thereby reducing network congestion problem by re-directing requests to the HS. Second, the PH buffer may be viewed as a form of short term dynamic cache storing only the last few seconds of data of the requested live SM broadcast, referred to as the playout history. The cached data is made immediately available to a requesting client to fill the client's playout buffer as rapidly as possible.

In a preferred embodiment, upon receiving an initial client request for a live SM broadcast at an HS, the HS allocates a playout history (PH) buffer in its local memory to store the last few seconds of the live broadcast stream (i.e., the playout history). As the playout history is being stored in the PH buffer, the live SM broadcast is simultaneously streamed to a first requesting client. However, upon receiving subsequent requests for the same live SM broadcast, the playout history is available from the PH buffer to be streamed to the requester, filling each requestor's playout buffer at a higher data rate than is achievable in the prior art, thereby reducing start-up latency.

According to another aspect of the present invention, in addition to the PH buffers allocated in response to client requests, the HS may also be manually pre-configured to maintain one or more pre-configured PH buffers. Each pre-configured PH buffer is allocated at a configuration stage prior to actual operation. These buffers presume that a certain number of live SM broadcasts will be in high demand. Such "popular" live SM broadcasts may include, for example, vintage rock, classic rock, talk radio, etc. In contrast to the non pre-configured PH buffers, discussed above, which are allocated and de-allocated in response to fluctuating client demand, the pre-configured PH buffers are permanently maintained in the memory from the outset of operation, independent of client demand.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

To facilitate an understanding of illustrative embodiments of the present invention, it is advantageous to first consider the network operating environment of the present invention, as well as a selection of definitions relating to system architecture and operation.

Illustrative embodiments of the present inventive architectures, systems, and methods described herein focus on data streaming in global, worldwide networks, such as the Internet. Those skilled in the art will recognize, however, that the present architectures, systems, and methods will be applicable to a wide variety of data networks and applications. The following terms and definitions are used in the present disclosure:

Live Streaming Multimedia (SM) broadcast object: a type of data whose transmission has temporal characteristics such that the data may become useless unless the transmission rate is regulated in accordance with predetermined criteria (e.g., audio and video files). Transmission can start at any point within the live SM broadcast object and can be terminated by the receiver at any time.

Helper Server (HS): an HS, also referred to as a helper, is one of a plurality of servers in the network that provide certain value-added services. For example, an HS can provide caching services and/or prefetching services. HSs selectively cooperate and communicate streaming SM broadcasts (or segments of such objects) between and among each other and between content providers and clients. That is, HSs understand an object's transmission requirements and can behave, in some respects, like a content provider.

Cache: a region on the computer disk that holds a subset of a larger collection of data. In the present invention, a form of dynamic cache is allocated in the memory of the HS, referred to as a playout history (PH) buffer for storing the last few seconds of a live SM broadcast Data stream: a data stream transmits segments of an SM broadcast from one source to one or more multiple receiving hosts. The source might be the sender (i.e., the content provider) or an HS. Receiving hosts could be HSs or receivers (i.e., clients).

Figure 1:
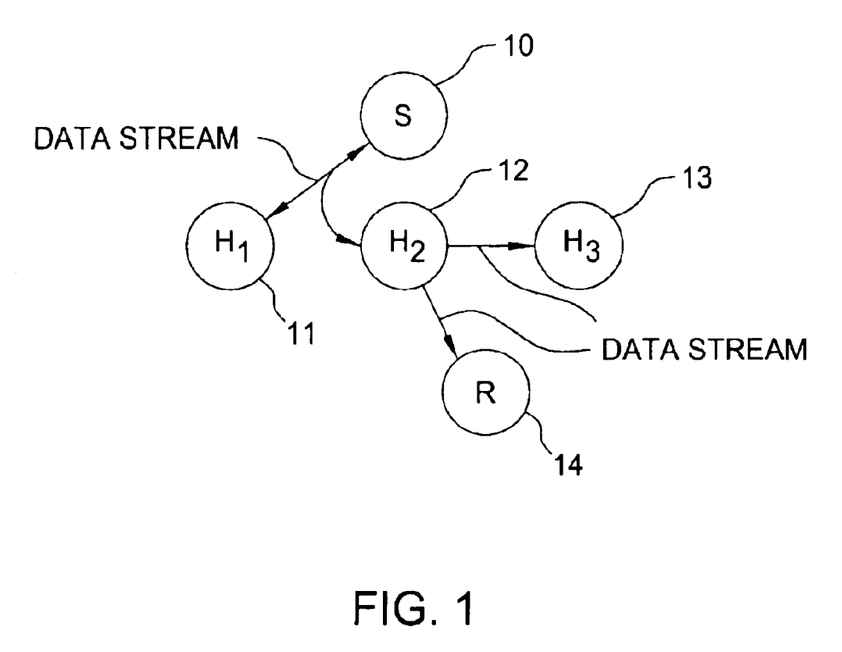
FIG. 1 is an illustration of a network system which includes HSs used in accordance with the present invention.

FIG. 1 illustrates various elements of the terms defined above. Specifically, FIG. 1 shows an illustrative source 10 delivering a data stream directly to each of the helpers H1 11 and H2 12. Helper H2 12 is further shown delivering a data stream to each of the helper H3 13 and receiver R14. In general, the data stream from helper H2 12 to helper H3 13 need not be the same as that arriving at receiver R 14, but in this example the data stream from helper H2 12 to helper H3 13 is illustratively part or all of the same live SM broadcast transmitted by the data stream arriving at receiver R 14.

Streaming architectures in accordance with illustrative embodiments of the present invention support techniques to enhance caches to support streaming multimedia over a public network system, such as the Internet. While caching is the traditional approach for improving scalability, it fails to scale in terms of object size and number of supported streams for streaming multimedia objects. In particular, existing solutions for streaming multimedia on the Internet have several shortcomings because these solutions use a separate unicast stream for each request, thus requiring a stream to travel from the server to the client across the Internet for every request.

To overcome these drawbacks and to further enhance the ability of existing caching systems to properly scale in terms of object size and number of supported streams, illustrative embodiments of the present invention utilize a caching method which is implemented via a novel system architecture to enhance existing caching systems. In particular, the method employs playout history (PH) buffers in the random access memory of each HS, to reduce start-up latency associated with live SM broadcasts. Each PH buffer may be considered as a form of short term dynamic cache for storing the last few seconds of a live SM broadcast.

Figure 2:
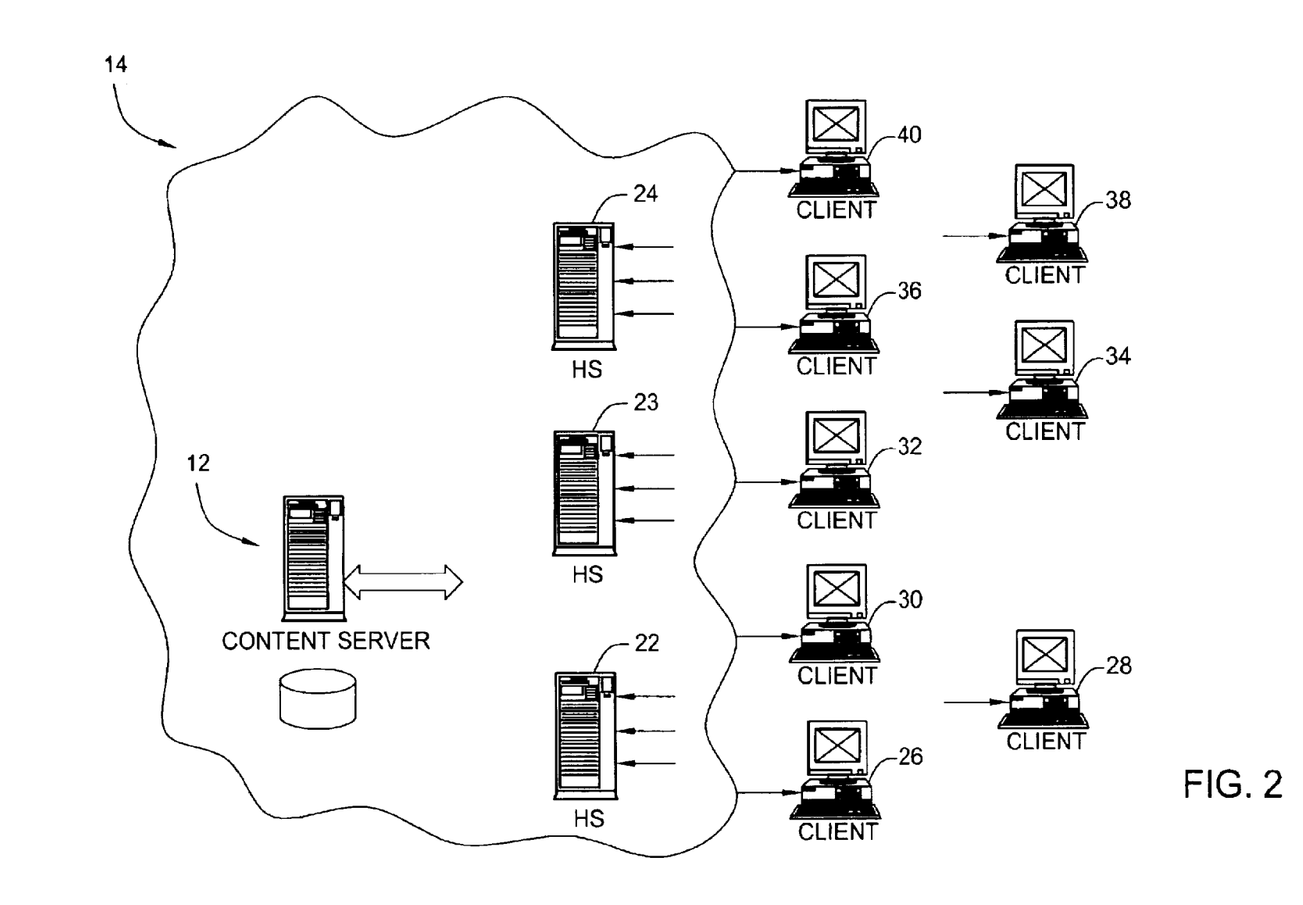
FIG. 2 is an illustration of a network system constructed according to one implementation of the invention.

FIG. 2 illustrates an exemplary arrangement for using the invention in a public network system (PNS) 14. FIG. 2 includes a server computer, as represented by content server 12, which stores and serves content over the network 14. The illustrative network 14 is a high-speed, high-bandwidth interactive distribution network, and can be representative of the Internet. The content server 12 serves content in the form of text, audio, video, graphic images, and other multimedia data. In the Internet context, the content servers might represent Web sites which serve or multicast content in the form of hypermedia documents (e.g., Web pages) to "client" computers, as represented by client computers 26–40. The network further includes HSs 22–24. Each HS 22–24 is configured as a conventional server having processing capabilities, including a CPU (not shown) and storage. HSs 22–24 cache Internet resources, such as those requested by client computers 26–40 that have been downloaded from the content server 12 to allow localized serving of those resources. The interaction and cooperation of the above entities are further described below.

With reference to the architecture of a typical client in the network 14 described above, a client is capable of receiving streaming multimedia data and maintains a playout buffer to absorb jitter. The use of playout buffers to absorb jitter variations that are smaller than the playback length of the buffer content are well known in the art, and serve to enhance perceived playback quality. A larger buffer would naturally absorb more jitter. Without playout buffers, a client is likely to observe interruptions in playback due to temporary network congestion over the public network.

Figure 3:
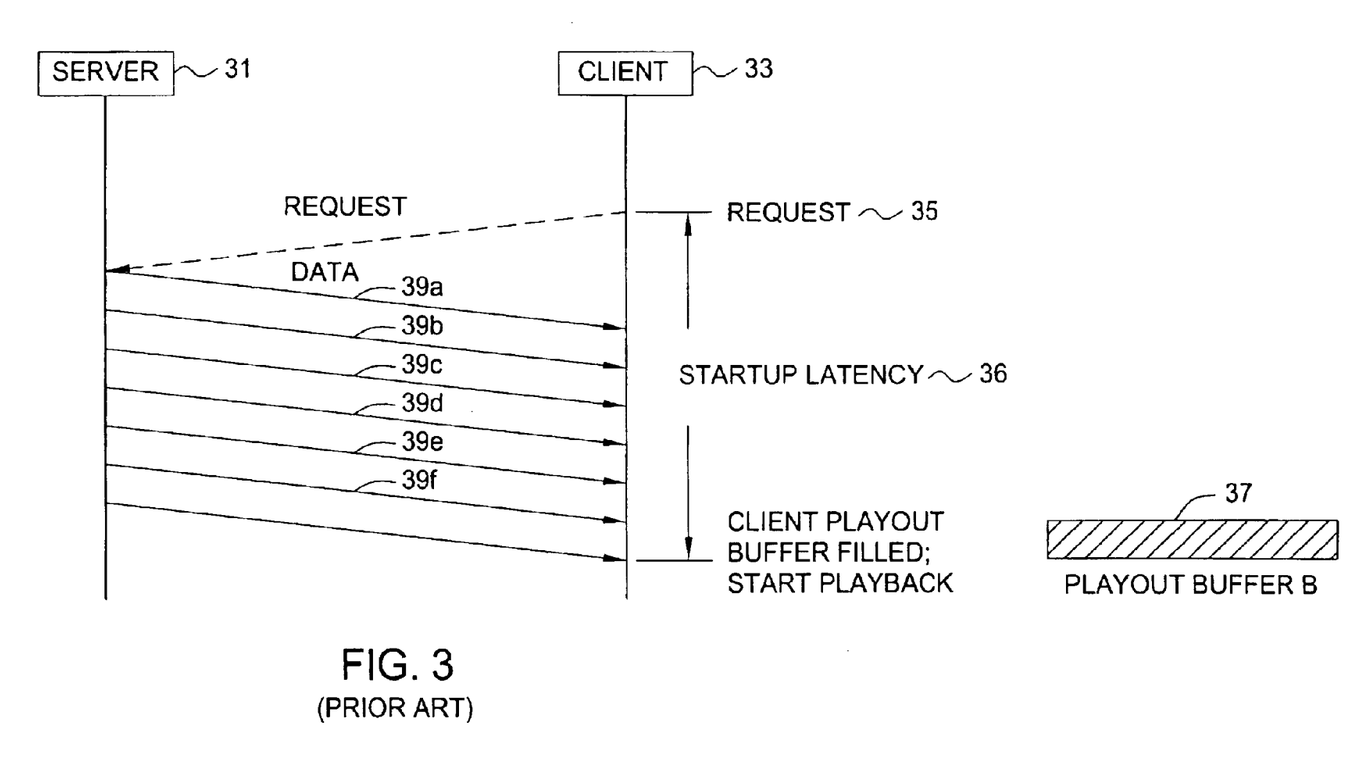
FIG. 3 is an illustration for describing playback delay at a client terminal according to the prior art.

FIG. 3 is a data flow diagram, according to the prior art, illustrating the playback delay experienced at a client. FIG. 3 includes a content server 31, a single client 33 having an associated playout buffer B 37. FIG. 3 illustrates the client 33 making a request 35 to the content server 31 for a live SM broadcast object. In accordance with the principles of unicasting, the content server 31 will only stream packets over the network in response to a request (e.g., request 35).

Accordingly, in the illustrative example, the content server 31 starts to stream packets (i.e., 39a, 39b, 39c, etc.) to the client 33 upon receiving the client request 35. FIG. 3 further illustrates a start-up latency 36, defined as the time interval the client 33 must wait until requested data can be displayed at the client computer. The start-up latency is defined as the time difference between the initial request 35 and the point in time at which the client's playout buffer B 37 is filled. Note that the client's playout buffer B 37 is considered full upon receiving data packet 39f.

The start-up latency is a function of both the playout buffer size and the content server streaming rate. In general, the size of a client's playout buffer is configurable, being set according to network connectivity and client needs and will typically hold data sufficient to playback 5 to 10 seconds of an SM broadcast. The present invention, however, does not contemplate altering the size of the playout buffer to achieve a reduced start-up latency (i.e., faster playout buffer fill rate) and will not be discussed further. The present invention reduces start-up latency by enhancing the streaming data rate to the client's playout buffer. This is achieved by utilizing helpers (i.e., HSs) throughout the network, as shown in FIG. 2, HS 22–24, where each HS maintains one or more playout history (PH) buffers which act as a form of dynamic cache storing data packets which comprise portions of a live SM broadcast object. By re-directing client requests to the HSs and servicing those requests from the PH buffers maintained in a local memory associated with an HS the streaming data rate to the client is enhanced and start-up latency is accordingly reduced.

The architecture of the present invention affords an enhanced streaming data rate as a consequence of the HSs being co-located with the requesting clients, and because the PH buffers act as a form of dynamic cache. First, with respect to co-location, the distance between content server and clients is typically orders of magnitude greater than that between HSs and clients. The closer proximity between Hss and clients allows for a higher streaming data rate. Second, servicing requests from the PH buffers further enhances the streaming data rate making a number of previously stored data packets of the requested stream immediately available to be streamed to the client. The method of utilizing PH buffers at a local HS in the network will be described in greater detail below with reference to FIGS. 4–7.

Figure 4A:
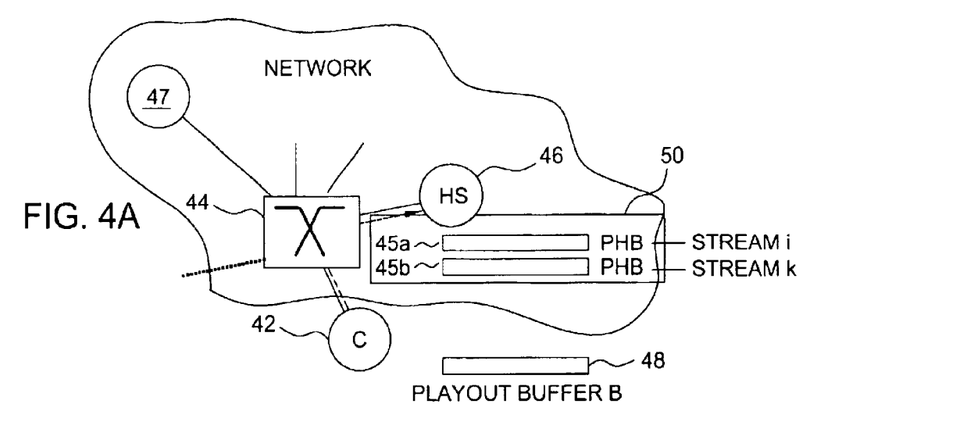
FIG. 4a is an illustration of a network system for describing the allocation of playout history (PH) buffers at an HS according to the present invention.

Referring first to FIG. 4a which illustrates a portion of the network environment according to the present invention, FIG. 4a includes helper HS 46 having an associated local memory 50 in which two playout history buffers 45a and 45b have been allocated. FIG. 4a further shows a content server 47, a single client C 42, and a network layer-4switching element 44. The present invention assumes that all client requests for live SM broadcasts are redirected to a client's local HS 46 to be serviced therefrom. This is distinguishable from the prior art where requests are transmitted from the client directly to the content server. This request redirection can occur in a number of ways including, but not exclusive to: (1) the use of a layer-4 switching element 44 which is one type of transparent approach or (2) by configuring a proxy in the client's C 42 software.

In a preferred embodiment, the HS 46 will handle the client request and forward the data to the client C 42 in accordance with the IPworX™ streaming architecture, a product of Lucent Technologies, Murray Hill, N.J., which uses well known multimedia streaming protocols.

Figure 4B:
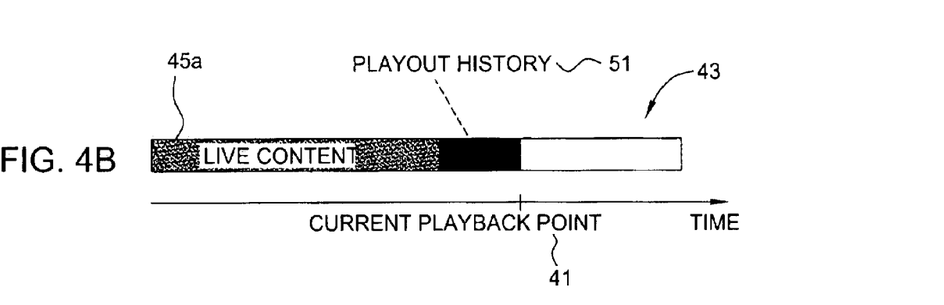
FIGS. 4b and 4c are illustrations of a representative live streaming multimedia (SM) broadcast which shows how the PH buffer of FIG. 4a operates as a moving window.
Figure 4C:
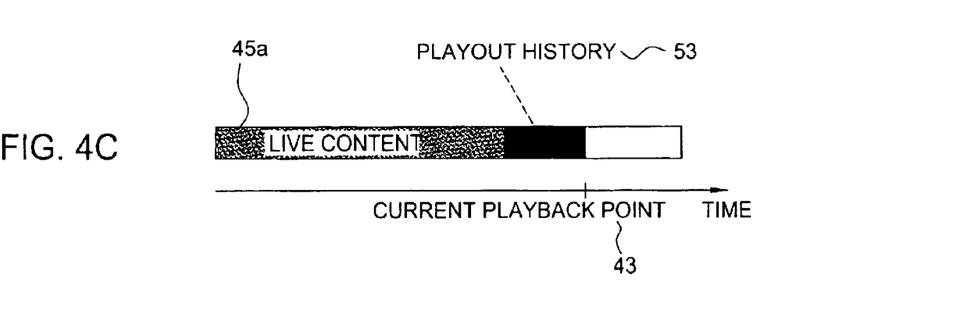

FIGS. 4b and 4c illustrate a representative live SM broadcast 43 being streamed from the content server 47. When an HS in the network receives a request for a live SM broadcast, the HS will configure itself to start receiving the live SM broadcast from the content server 47. It is presumed that the HS will only start receiving data packets from the content server 47 which make up the live SM broadcast upon receiving a request for the live SM broadcast. An exception occurs in the case of pre-configured PH buffers for popular live SM broadcasts, which is discussed in detail below. Briefly stated, in the case of popular live SM broadcasts, data packets are automatically streamed from the content server 47 to the HS from the start of operation without the necessity of a request.

In the case of a non-popular live SM broadcast, upon receiving a request at the HS, a playout history buffer 45 is allocated at the HS. The HS will then transmit the request for the live SM broadcast to the content server 47. In response, the content server 47 will begin streaming data packets which make up the requested live SM broadcast to the HS. The received data packets are immediately forwarded to the client as they are received from the content server and simultaneously stored in the playout history buffer 45. The playout history buffer is of a fixed size, and is therefore capable of storing only a limited number of data packets at any one time. It is convenient to view the storage of data packets as a moving window in that advances with the broadcasted stream, as shown in FIGS. 4b and 4c. As data packets are received from the content server 47, only the most recently received N data packets are stored in the playout history buffer 45. As newer (i.e., more recently received) data packets arrive they take the place of older data packets in the buffer 45. FIGS. 4b and 4c use a current playback point 41 to more clearly illustrate this concept. The current playback point 41 points to the most recently received data packet from the content server 47 to be stored in the playout buffer 45. As data packets are received from the content server 47, the current playback point 41 advances accordingly to point to the most recently received data packet of the requested live Sm broadcast stream. The N most recently received data packets which fill the playout buffer 45 are referred to in FIGS. 4b and 4c as the playout history which makes up the last few seconds of the live SM broadcast stream.

As described above, the playout history (PH) buffer was allocated in response to a client request. This class of PH buffer is referred to herein as non pre-configured PH buffer. Once allocated, a non pre-configured PH buffer is maintained in the memory of the HS as long as at least one client is making a current request for a live SM broadcast corresponding to the allocated non pre-configured PH buffer. If the client making the request terminates the request, or time-outs (e.g., if there is no feedback from the client for a specified period of time) the PH buffer will be de-allocated (i.e., purged) from the memory.

A second method, contemplated by the present invention, for allocating PH buffers in the memory is by manual pre-configuration, as mentioned in brief above. Manually pre-configured PH buffers are allocated at a pre-configuration stage at the discretion of the system designer. Each HS in the network may be manually pre-configured such that one or more PH buffers are allocated in the memory prior to the start of operation, and permanently maintained thereafter, to service client requests for certain live SM broadcasts which have been determined by the system designer to be "popular". Popular live SM broadcasts, may include, for example, vintage rock, classic rock, talk radio, etc. These broadcasts share the common trait of being frequently requested by clients. It is therefore more efficient to maintain these pre-configured PH buffers permanently in the memory of an HS from startup to service the requests for live SM broadcasts deemed to be "popular".

In summation, the non pre-configured PH buffers differ from the pre-configured PH buffers method in three important respects: (1) non pre-configured PH buffers are never allocated at a pre-configuration stage. Instead, they are only allocated in response to a client request; (2) once a non pre-configured PH buffer has been allocated it may be de-allocated (i.e., purged from the memory) when it is determined that there are no longer any client requests for the live SM broadcast being serviced by the PH buffer; and (3) There is no guarantee that a non pre-configured PH buffer will be allocated in response to a request. Instead, the allocation of the PH buffer is dependent in part upon the current availability of memory space. As such, when it is determined that the memory is at or near capacity, a client request for a live SM broadcast which requires the allocation of a new PH buffer may be rejected. It is noted, however, that every client request is serviced from the HS irrespective of whether a PH buffer is allocated or not.

In the situation where a new client request is received, and the memory is determined to be at or near capacity, the present invention may de-allocate (i.e., purge) one or more previously allocated non pre-configured PH buffers from the memory to make a sufficient amount of memory available to allocate a new non-pre-configured PH buffer to service the most current request. The process of de-allocating an existing PH buffer may operate according to a least frequently used (LFU) or least recently used (LRU) methodology, which are well known in the art. Other methods of de-allocating an existing PH buffer are within the scope of the present invention.

Figure 5A:
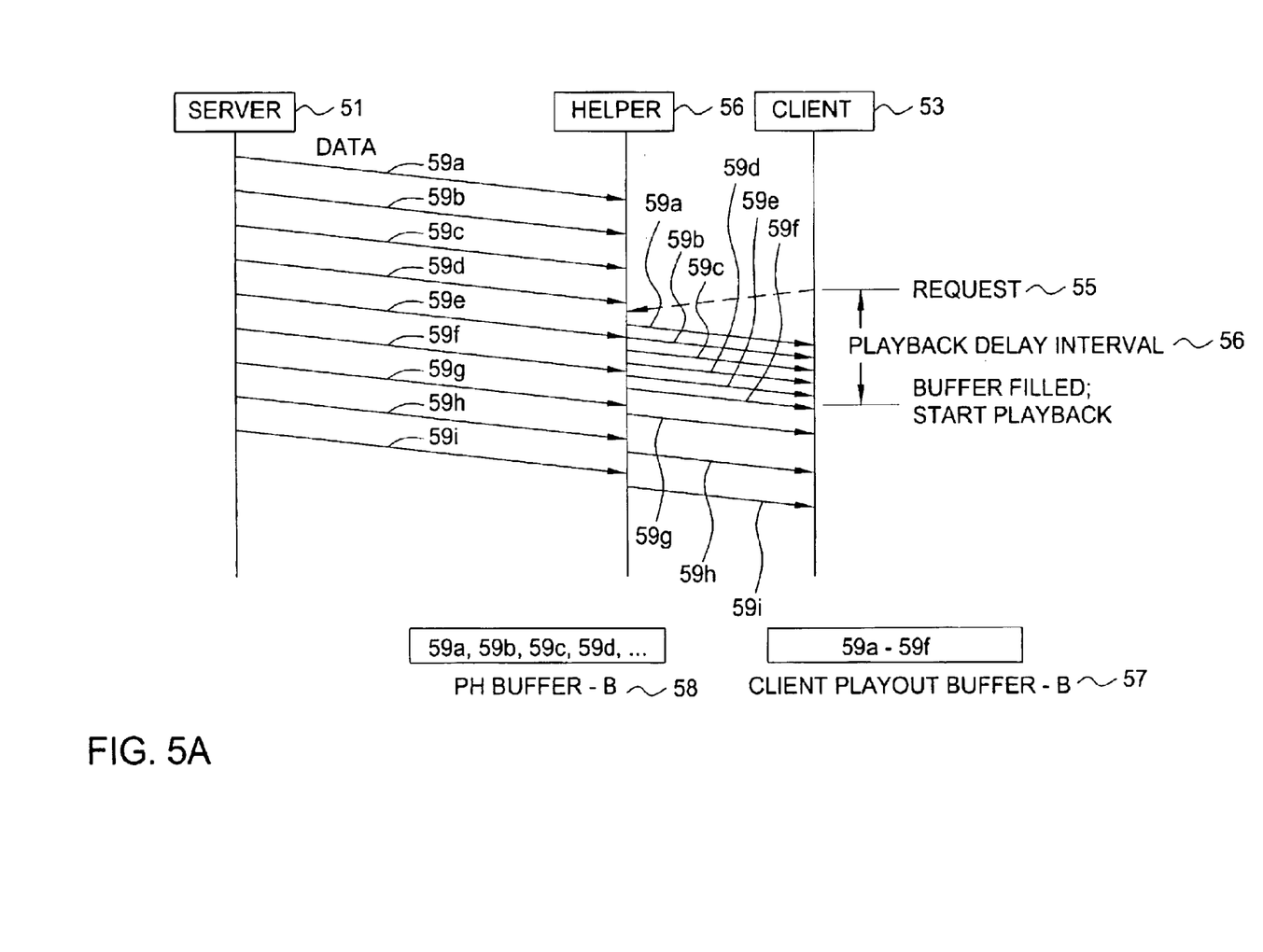
FIG. 5a is an illustration for describing playback delay at a client terminal when a request is made for a "popular" live SM broadcast according to the present invention.
Figure 5B:
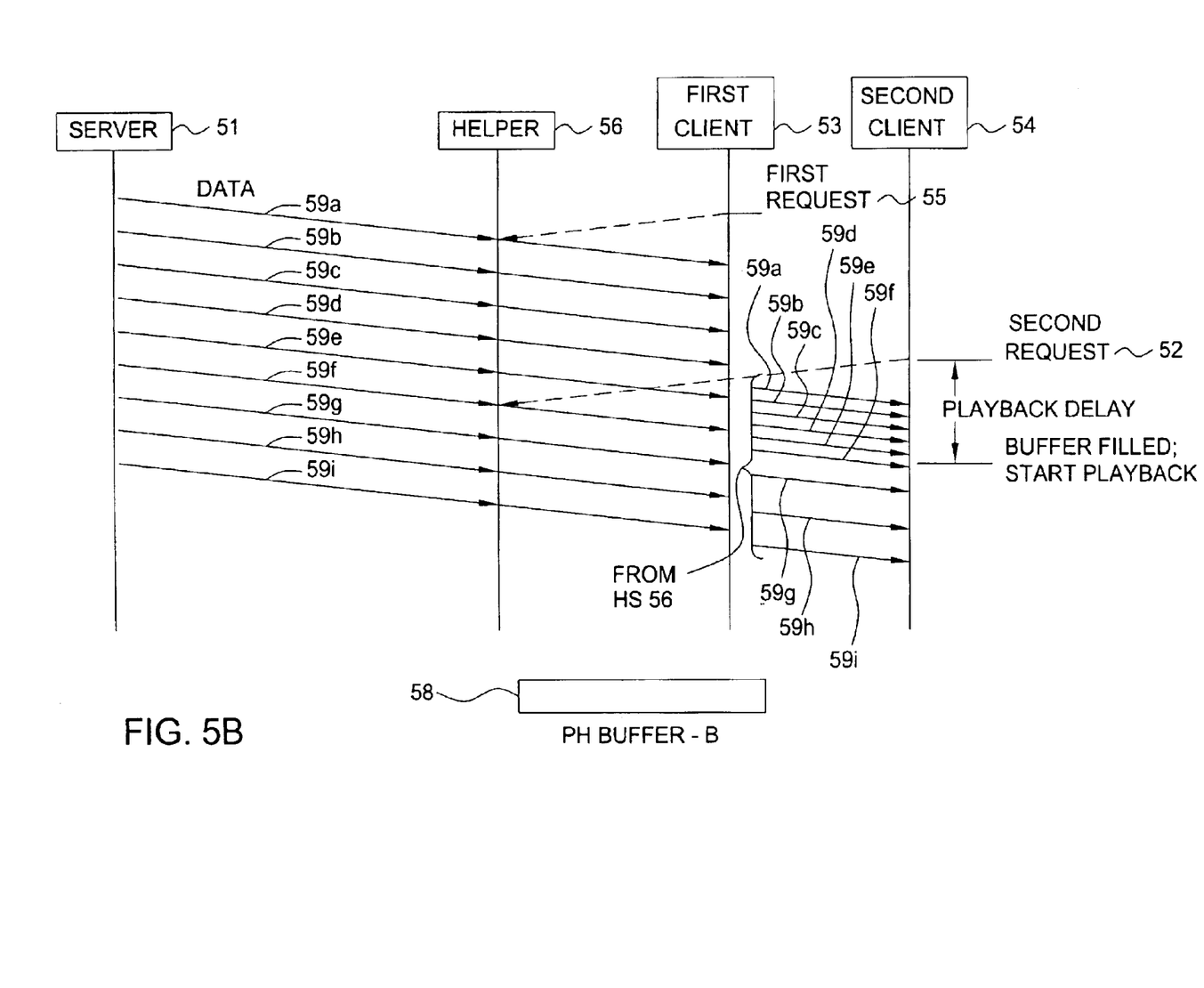
FIG. 5b is an illustration for describing playback delay at a client terminal when a request is made for a "non-popular" live SM broadcast according to the present invention.

FIGS. 5a and 5b are data flow diagrams for illustrating the caching method of the present invention. FIG. 5a assumes a client request was received for a "popular" live SM broadcast object for which a PH buffer has been manually pre-configured (i.e., allocated at a pre-configuration stage). FIG. 5b, assumes a client request was received for a "non-popular" live SM broadcast object and no other client is currently being served for this live SM broadcast. In accordance with the teachings of the present invention, non pre-configured PH buffers are allocated only in response to client requests.

Referring first to FIG. 5a. FIG. 5a illustrates the architecture of the present invention which includes a content server 51, an HS 56, and a client 53. As previously stated, the exemplary illustration of FIG. 5a assumes that the PH buffer B 58 was allocated at a configuration stage to service a "popular" live SM broadcast. FIG. 5a shows data packets 59a–59i, which make up a portion of a "popular" live SM broadcast, being streamed from the content server 51 to the HS 56. As data packets are received at the HS 56 they are stored in the pre-configured PH buffer B 58. The stored data packets constitute the current playout history, as defined by FIGS. 4b and 4c. Upon receiving a client request 55 for the "popular" live SM broadcast stream, the current playout history (see directional arrows 59a–59d between HS 56 and client 53) is streamed from the PH buffer B 58 to the requesting client 53 at a higher data rate than the data rate at which data packets are received from the content server 51 to the HS 56 (see directional arrows 59a–59d between content server 51 and HS 56). The higher data rate is illustrated in FIG. 5a by the more closely spaced lines between HS 56 and client 53. The higher data rate is realized by virtue of having stored data packets available in the PH buffer B 58.

Servicing the request 55 from the pre-configured PH buffer B 58 provides two distinct advantages over the prior art. First, because a client making a request 55 is serviced from the HS 56, and not from the content server 51, data can be streamed more quickly to the client 53 given that client 53 and HS 56 are co-located. This is in contrast to the distance between client 53 and content server 51 which is typically orders of magnitude larger. A second advantage afforded by the present invention is that the stored data packets representing the playout history of the live SM broadcast is streamed to the client 53 at a higher data rate analagous to the operation of a cache. The PH buffer is distinguishable from a cache in that it is dynamic. That is, it acts: as a moving window of fixed size that advances with the live broadcast stream, storing only the last few seconds of the datastream. By contrast, a conventional cache's data exchange is more static.

It is further noted that subsequent to streaming the playout history to the client from the pre-configured PH buffer in response to a client request, successive packets which make up the datastream will be transmitted from the HS to the client at the content server rate. This occurs because once the buffer has been depleted, it cannot be filled faster than the rate at which packets are received from the content server 51. In the illustrative example, subsequent to streaming the stored packets (i.e., playout history: data packets 59a–59f) from the PH buffer B 58, the PH buffer is emptied and awaits the reception of the next data packet in the broadcast stream, i.e., data packet 59g to be stored in the buffer B 58. The more widely spaced directional arrows associated with data packets 59g, 59h, and 59i illustrate that the data rate is no longer the high data rate associated with stored data packets 59a–59f, but rather, equal to the rate at which the currently stored data packets are received from the content server 51. While a data packet transfer rate reduction occurs upon depleting the buffer B 58, the objective of the present invention (i.e., the reduction of start-up latency) is satisfied in that the previously stored data packets 59a–59f are streamed to the client's playout buffer B'57 at a higher data rate, as shown, thereby reducing start-up latency. In addition, by servicing the request from the HS 56, as opposed to the content server 51, start-up latency is further reduced given the co-location of HS 56 and client 53.

It is further noted that any subsequent client request will benefit in the same manner as that described-above for the illustrative request 55. That is, any subsequent request is serviceable from the permanently maintained pre-configured PH buffer which acts as a moving window storing the playout history of the live SM broadcast stream.

FIG. 5b illustrates the case where a non-pre-configured PH buffer is allocated in response to a request for a live SM broadcast object. In the exemplary illustration of FIG. 5b, the PH buffer B 58 is allocated in the local memory of HS 56 subsequent to receiving a first request 55 from a client. Upon receiving a first request 55 at HS 56, the first requesting client 53 will receive data packets, 59a–59i at the content server rate since no PH buffer was allocated prior to the first request. This is in contrast to FIG. 5a where the pre-configured buffer B 58 was allocated prior to receiving any requests, making the stored data available to any requesting client at any point in time. While client 53 does not realize any data rate advantage, subsequent client requests for the same non-popular live SM broadcast will realize a data rate advantage, as will be described.

At some later time, if a second client 54 makes a second request 52 for the same non-popular live SM object while the nonconfigured PH buffer is still maintained, the non configured PH buffer is available to service this second request 52 affording the second requesting client a data rate advantage associated with being able to receive the playout history of the nonconfigured PH buffer created in response to the first request 53. This case is illustrated by the more closely spaced directional arrows (i.e., data packets 59a–59f) directed from HS 56 to the second requesting client 54. Once the PH buffer has been depleted, the subsequent data packets 59g, 59h, 59i . . . , etc. will be distributed to the second requesting client 54 at the content server rate, similar to the case described above with reference to FIG. 5a.

When a PH buffer is allocated upon receiving a client request, as described in conjunction with FIG. 5b above, the PH buffer is maintained in the memory of the HS as long as there is at least one currently active request. For example, if both request 53 and request 54 have been completed or both terminate, and no further requests have been received, or are currently being received, for the live SM object associated with the nonconfigured PH buffer, the PH buffer will be de-allocated from the memory.

The caching logic of the present invention will now be described with reference to the flowchart of FIG. 6.

Figure 6:
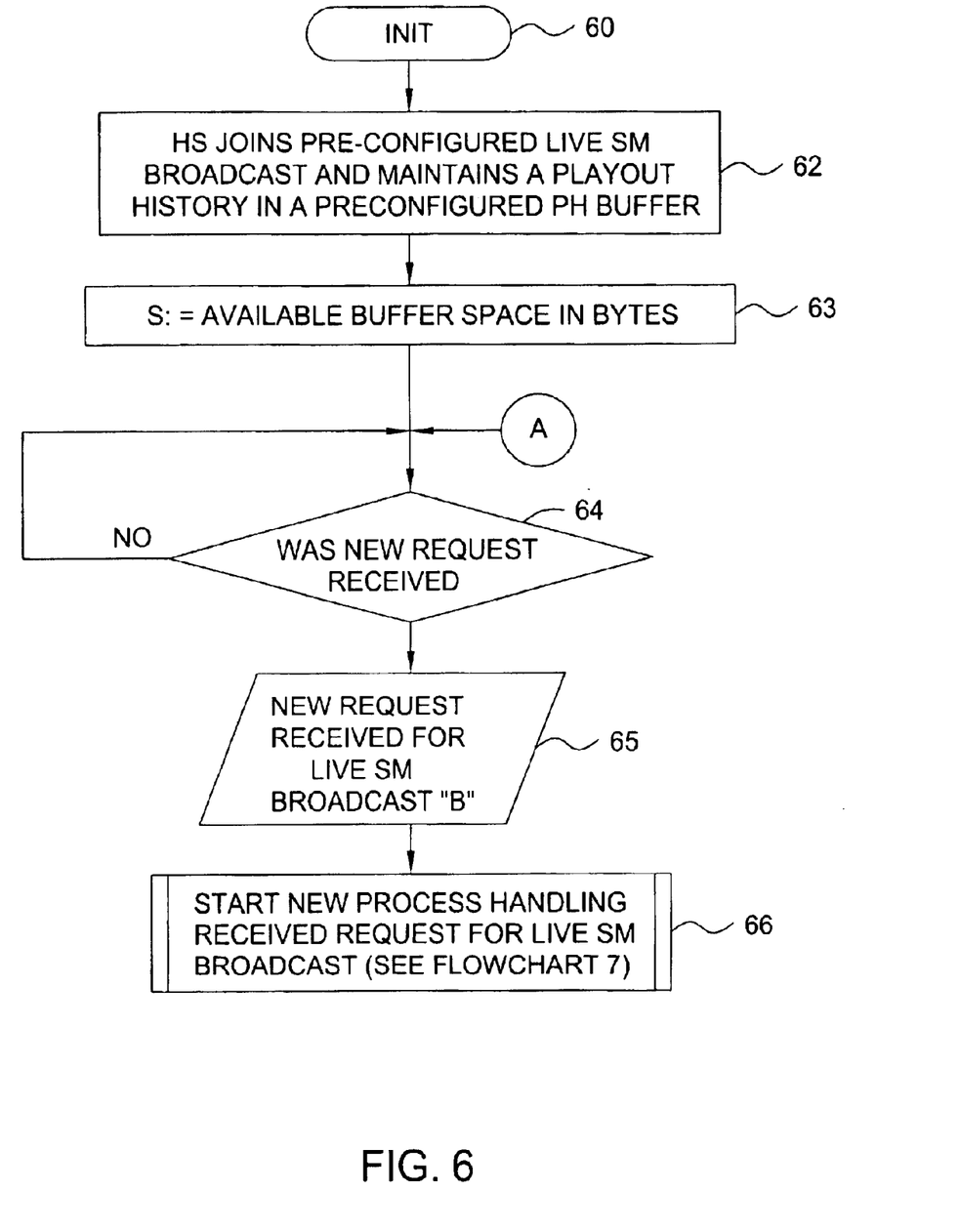
FIG. 6 is a flowchart for illustrating the caching method of the present invention.

The caching logic of the HS is shown at a high level of abstraction in FIG. 6. The logic description of FIG. 6 assumes that a server is simultaneously broadcasting a plurality of live SM broadcasts throughout the network. Further, the simultaneous broadcasts are not directed to any particular entity in the network, but rather, are distributed such that any HS in the network may receive them. In addition, whenever a client makes a request for one of the plurality of live SM broadcasts, the request is assumed to be re-directed to an HS 56 co-located with the requesting client to be serviced therefrom. From the perspective of a particular HS in the network, the HS may be manually pre-configured to have a number of PH buffers dedicated to popular live SM broadcasts from among the plurality of live SM broadcasts being streamed from the content server. These popular PH buffers will be continually maintained at the HS, irrespective of client demand.

Referring now to the high level flowchart of FIG. 6. It is assumed that a content server 51 continuously streams one or more live SM broadcasts throughout the network. It is further assumed that each HS has been manually pre-configured to maintain a PH buffer for one or more "popular" live SM broadcasts prior to actual operation. It is noted that the following steps are made with reference to a representative HS in the network.

Step 60 is an initiation step which indicates the start of operation. At step 62, the HS joins the "popular" live broadcasts for which the HS has been manually pre-configured. An HS joins a "popular" live broadcast by sending a request to the content server that the HS wishes to receive the data packets which make up the "popular" live SM broadcast. A PH buffer which was previously allocated at a manual pre-configuration stage will successively store the data packets which make up the "popular" live SM broadcast. Those data packets which are currently stored in the PH buffer are referred to as the playout history which constitute the last few seconds of the live "popular" SM broadcast. The playout history is described above with reference to FIGS. 4a and 4b. At step 63, a variable S is initialized to the current available buffer space, in bytes, in a random access memory associated with the HS. Knowing the size of the available memory, S, is required to properly allocate and de-allocate PH buffers from the random access memory, as will be described. Next, at step 64, the HS determines whether a client request has been received at the HS. If not, the process remains in the loop until such time as a client request is received. Upon receiving a client request (e.g., request "B" in the present illustrative example) for a live SM broadcast at step 65, a process is initiated at step 66 to handle the client request. This process is described in detail with reference to the flowchart of FIG. 7.

Figure 7:
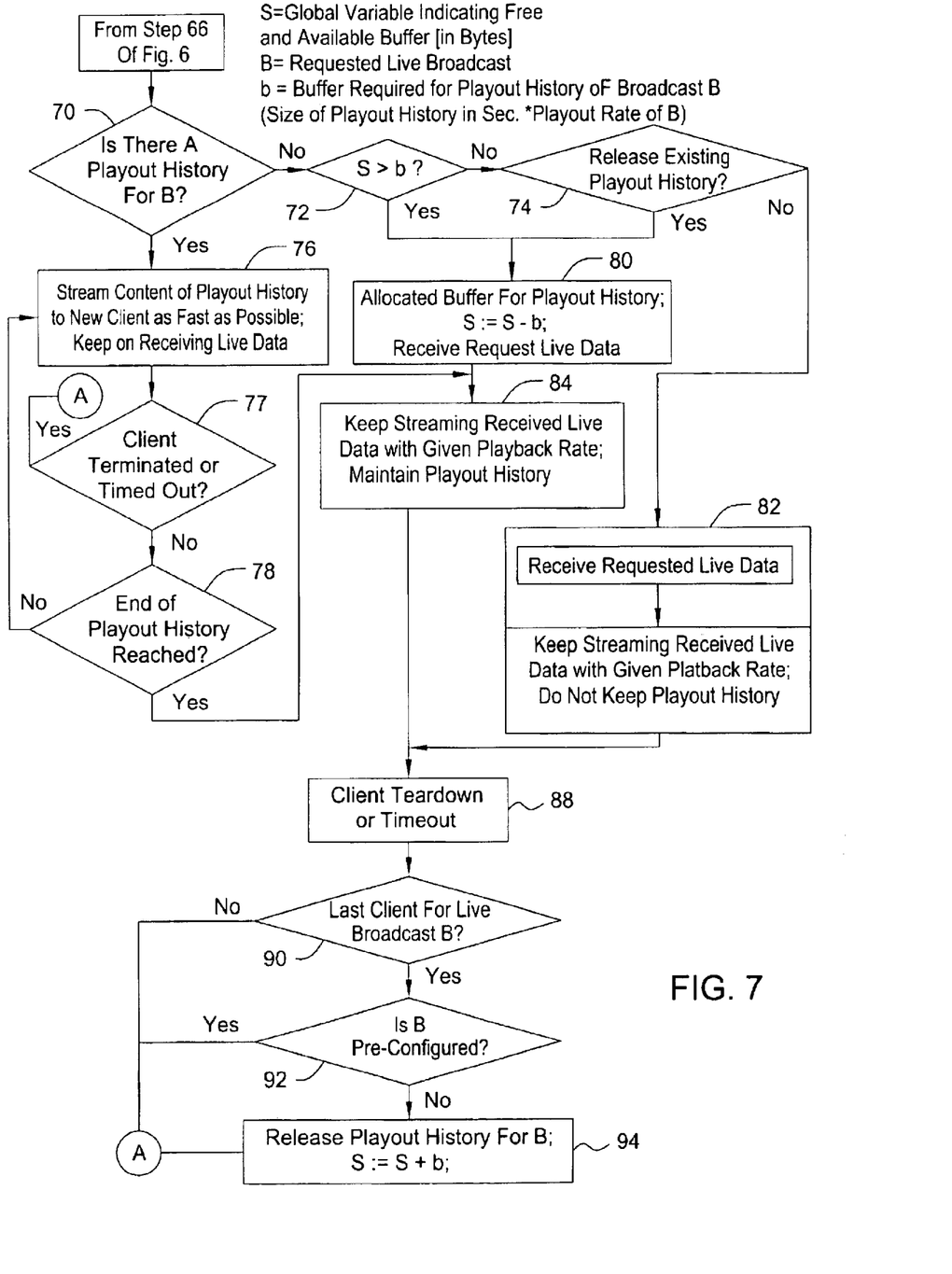
FIG. 7 is a flowchart illustrating the step of processing a received request for a live broadcast, as described in the flowchart of FIG. 6, according to the present invention.

FIG. 7 represents the detailed steps associated with the process of handling a client request for a live SM broadcast at the HS. Parameters S, B, and b are used throughout FIG. 7 and are defined as follows: Parameter S is a global variable indicating the amount of free (i.e., available) random access memory associated with the HS; Parameter B represents a request for a live SM broadcast; Parameter b is the size of the PH buffer required to store the playout history of live SM broadcast B.

Step 70 determines whether request received at the HS for the live SM broadcast "B" is for a "popular" or a "non-popular" live SM broadcast. If the request is for a "popular" live SM broadcast, a manually pre-configured PH buffer will have been previously established at a pre-configuration stage. The process then continues at step 76 where the playout history (i.e., the last few seconds of the "popular" live SM broadcast stored in the pre-configured PH buffer) will be streamed to the requesting client. The process then continues at step 77, which determines if the requesting client has terminated the request or timed out. If so, the process returns to step 64 of the flowchart of FIG. 6. Otherwise, the process continues at step 78 which determines whether all data packets stored in the PH buffer have been streamed to the client (i.e., end of playout history reached?). If not, the process continues in loop 76–78 until the end of the playout history is reached. Once step 78 is satisfied, the process continues at step 84. At step 84, subsequent data packets which make up the requested live SM broadcast received by the HS are streamed to the requesting client from the HS at the content server rate. The content server streaming rate is slower than the rate at which the playout history is streamed to the client because the playout history represents some number of previously stored data packets. Once the contents of the PH buffer is depleted, however, upon reaching the end of the playout history, the streaming rate is dictated by the rate at which packets are received at the HS by the content server (i.e., the content server rate). It is noted that as packets are received at the HS from the content server they are successively stored in the PH buffer, however, the successively stored packets are simultaneously streamed to the requesting client. Consequently, the current client does not achieve a further data rate advantage. The current client receives the successively received data packets at the content server rate as they are received and stored at the HS. The higher streaming rate is only achievable from the point in time when the client makes the initial request to the point in time at which the end of the playout history is reached. Step 88 determines if the client has terminated the request or timed out. If it is determined at step 88 that the client has either torn down the request or timed out, the process continues at step 90. At step 90 it is determined whether the requesting client was the last client requesting the live SM broadcast. If the client was determined to be the last client requesting live SM broadcast "B", the process continues at step 92 where it is determined whether the requested live SM broadcast "B" was for a "popular" live SM broadcast for which the HS maintains a pre-configured PH buffer or for a "non-popular" live SM broadcast. If the request was for a "non-popular" live SM broadcast, the process continues at step 94, where the PH buffer allocated to service the requested live SM broadcast "B" is de-allocated from the memory of the HS, and the variable S is updated to reflect the additional memory re-acquired as a result of relinquishing the PH buffer. The process then returns to step 64 of the flowchart of FIG. 6. This branch to step 64 of FIG. 6 is also taken from steps 90 and 92, respectively, if it is determined either that the requesting client is the last client requesting broadcast "B", or that the PH buffer associated with broadcast "B" is a pre-configured PH buffer. In the event the live SM broadcast is determined to be a "popular" live SM broadcast at step 92, the PH buffer is not de-allocated, and is instead permanently maintained in the memory of the HS in accordance with the teachings of the present invention.

Returning to the no branch of step 70. If it is determined at step 70 that there is no pre-configured PH buffer in the memory of the HS for the requested live SM broadcast "B" (i.e., no playout history), the live SM broadcast request "B" is determined to be non-popular and the process continues at determination step 72. At step 72, a determination is made regarding whether there is sufficient memory space available prior to allocating a PH buffer in response to the received request "B" at the HS. That is, a determination is made regarding whether the number of available bytes, S, is larger than the size of the PH buffer size to be allocated in response to request "B". If it is determined that there is a sufficient amount of memory available to be allocated to the new request "B", the process continues at step 80 to be described below. Otherwise, if the available memory required to be allocated is determined to be insufficient, the process continues at step 74. Step 74 determines whether an existing PH buffer should be released from the memory to make a sufficient amount of memory available to accommodate the new request "B". The process of determining whether or not to release an existing PH buffer at step 74 is described with reference to the flowchart of FIG. 8 to be described below. If it is determined at step 74 that one or more existing PH buffers will be released from the memory to accommodate the new request "B", the process continues at step 80. At step 80 the parameter S, which tracks the amount of available memory, is updated to reflect the additional memory consumed by the PH buffer allocated in response to request "B". The process then continues at step 84, which has been previously described above. Otherwise, if it is determined at step 74 that no existing PH buffers will be released to accomodate the new request "B", the process continues at step 82 where the requested live SM broadcast "B" will simply be streamed to the requesting client with no PH buffer allocation being made in response to request "B".

Figure 8:
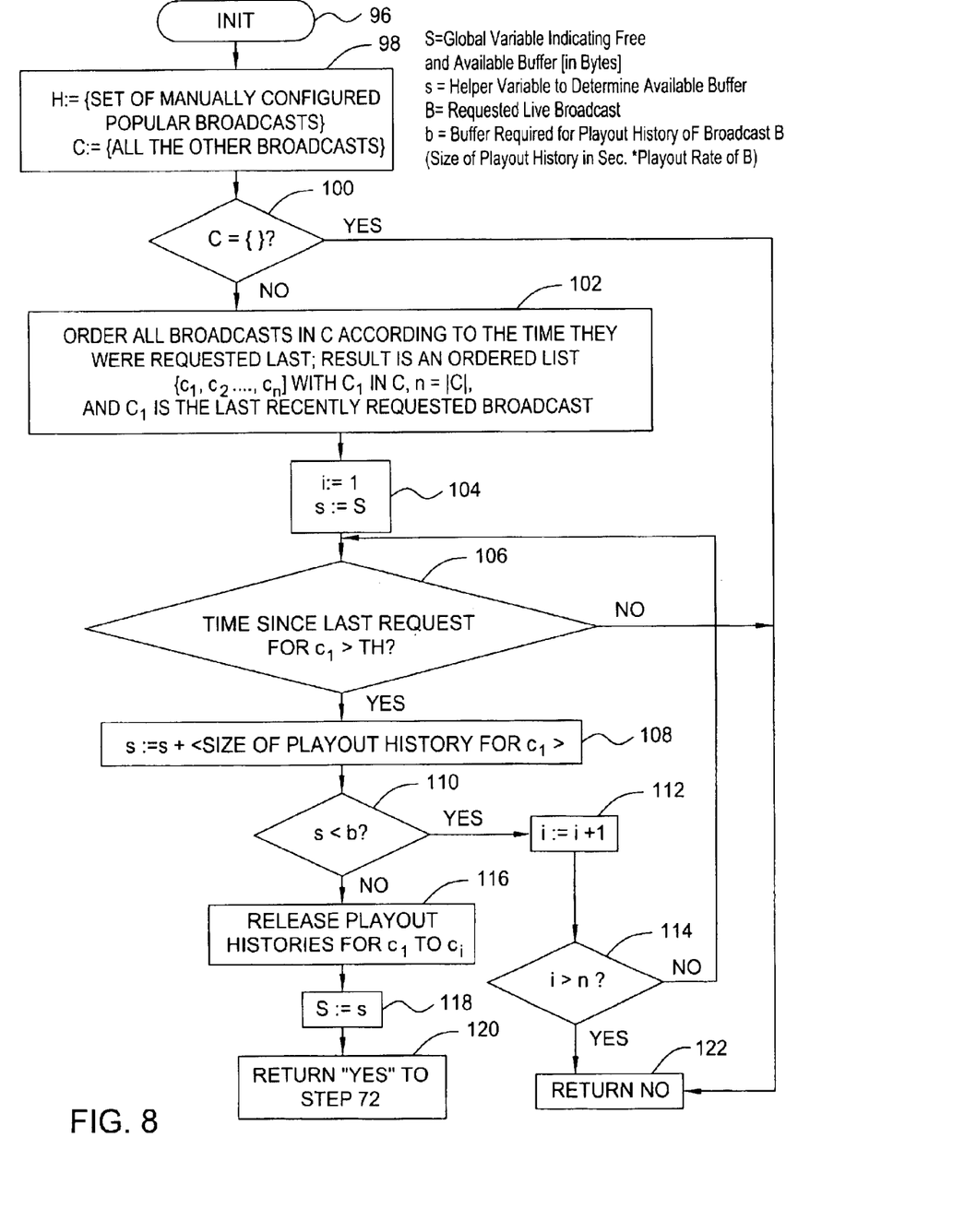
FIG. 8 is a flowchart illustrating a PH buffer replacement algorithm according to an embodiment of the present invention.

Referring now to the flowchart of FIG. 8, which describes the process of step 74 of the flowchart of FIG. 7 for determining whether or not to de-allocate one or more existing PH buffers from the memory to accommodate the new request "B". Step 96 is an intiation step. Step 98 defines two sets, a first set H, which defines the set of manually pre-configured PH buffers allocated in the memory and dedicated to servicing "popular" live SM broadcasts, and set C, which defines the set of PH buffers allocated in the memory in response to client requests for non-popular broadcasts. Step 100 determines whether the memory contains only pre-configured PH buffers (i.e., set C is the empty set). If set C is not empty, the process continues at step 102 where each live SM broadcast in the set C is sorted according to the time the live SM broadcast was last requested. For example, a sorted list $[c_1, c_2, c_3, \ldots c_n]$ is generated whereby $c_1$ refers to the last recently requested broadcast. The process then continues at step 104 where two parameters, a counter parameter "i" and a parameter to track the amount of available memory "s" are initialized to 1 and S, respectively. The process then continues at decision step 106 to determine whether the receive time of the last recently requested broadcast, $c_1$, is greater than a predetermined purge threshold, TH. If the receive time associated with request $c_1$ is determined to be less than the purge threshold, TH, $c_1$ will not be deleted as a result. As such, the process continues at step 122 where an indicator will be returned to determination step 74 of flowchart 7 to indicate that no existing PH buffers will be released to accomodate the new request "B".

If the yes branch is taken at step 106, it indicates that the request time associated with the last recently requested broadcast, $c_1$, from the ordered list, C, exceeds the purge threshold, TH and will be purged as a result at step 108. At step 108, the variable S is updated to reflect the additional memory made available as a consequence of purging the PH buffer associated with the ith ordered broadcast, $c_i$, from the memory to accommodate the new request, "B". At determination step 110, the updated variable, S, is then checked to determine whether there is sufficient available memory to allocate a PH buffer in response to request "B". If it is determined at step 110 that there is still insufficient memory space available to accommodate the new request, the process continues at step 112. At step 112, the parameter "i" is incremented by one to evaluate the receive time associated with the next broadcast, $c_{i+1}$ from the sorted list, C. Step 114 is a determination step to determine whether the end of the list has been reached (i.e., is I+1>n). If not, the process loops back to step 106 to repeat the process of determining whether the next broadcast from the sorted list exceeds the purge threshold, TH. If it is determined that there is sufficient available memory at step 110, the logic continues at step 116, where PH buffers associated with those requests identified as being in excess of the threshold TH will be de-allocated from the memory. At step 118, the amount of available memory in the system is updated to reflect the released playout histories (one or more) at step 116. At step 120, the process then returns an affirmative indication to process step 72 of FIG. 7 that one or more existing PH buffers has been released to accommodate request "B".

What is claimed is:

1. In a network having a content server which hosts a plurality of live streaming multimedia (SM) broadcast objects for distribution over said network through a plurality of helper servers (HSs) to a plurality of clients, a method of reducing start-up latency associated with distributing said plurality of live SM broadcast objects from said content server and said plurality of HSs to said plurality of clients, said method comprising:

receiving a first request from one of said plurality of clients for one of said plurality of live SM broadcast objects at one of said plurality of HSs;

determining whether said first request can be partially serviced from a pre-configured playout history (PH) buffer allocated in a memory associated with said one of said plurality of HSs; and partially servicing said first request from said pre-configured PH buffer at a first data rate, if said determining step is satisfied, the first data rate being higher than a standard data rate associated with servicing the first request from a non pre-configured PH buffer.

2. The method according to claim 1, further comprising the step of determining whether to allocate a non pre-configured PH buffer in said memory to service said first request, if said determining step is not satisfied.

3. The method according to claim 2, wherein the step of determining whether to allocate said non pre-configured PH buffer in said memory further includes the step of determining whether there is a sufficient amount of memory available in said memory to be allocated to said non pre-configured PH buffer.

4. The method according to claim 3, further comprising the step of determining whether to de-allocate at least one previously allocated non pre-configured PH buffer from said memory, when it is determined that there is an insufficient amount of memory available in said memory, comprising:

servicing said request without allocating said non pre-configured PH buffer, if there are not any non pre-configured PH buffers in said memory otherwise performing the following steps;

1) sorting all received requests in a least recently received time order to form a sorted request list;

2) evaluating an associated receive time for the ith request in said sorted list, where i ranges from 1 to the total number of received requests, to determine if said associated receive time exceeds a storage time threshold T;

If step 2 is satisfied:

a) de-allocating from said memory, said non pre-configured PH buffer associated with said ith request;

b) returning to step (2) if it is determined that there is an insufficient amount of free memory available in said memory and index I does not exceed the number of requests in said sorted list, otherwise servicing said request without allocating said non pre-configured PH buffer;

if step 2 is not satisfied:
servicing said request without allocating said non pre-configured PH buffer.

5. The method according to claim 2, further comprising the step of servicing at least one request for said one of said plurality of live SM broadcast objects from said at least one non pre-configured PH buffer at said first data rate, when said non pre-configured PH buffer is allocated in said memory to service said first request, wherein said at least one request is received at a time after receiving said first request.

6. The method according to claim 5, wherein the servicing step further includes the step of distributing data packets stored in said at least one of said at least one non pre-configured PH buffers to said one of said plurality of clients, wherein said data packets make up said one of said plurality of live SM broadcast objects.

7. The method according to claim 5, wherein said at least one request is serviced from said one of said plurality of HSs at the standard data rate when said non pre-configured PH buffer is not allocated in said memory.

8. The method according to claim 1, further comprising the step of storing a playout history associated with one of said plurality of live SM broadcast objects for said pre-configured PH buffer, wherein said playout history substantially comprises the last few seconds of said one of said plurality of live SM broadcast objects.

9. The method according to claim 1, wherein said pre-configured PH-buffer is allocated in said memory at a configuration stage.

10. The method according to claim 1, wherein said pre-configured PH buffer is permanently maintained in said memory.

11. The method according to claim 2, wherein said allocated non pre-configured PH buffer is de-allocated from said memory, upon determining:
a) said first request has been terminated or completed; and
b) there are no further requests being received at said one of said plurality of HSs to be serviced from said allocated non pre-configured PH buffer.

12. The method according to claim 1, wherein the step of determining whether said first request can be partially serviced from said pre-configured PH buffer further includes the step of determining whether said pre-configured PH buffer was previously allocated at a configuration stage.

13. The method according to claim 1, wherein the step of partially servicing said first request further includes the step of distributing data packets stored in said pre-configured PH buffer to said one of said plurality of clients, wherein said data packets make up said one of said plurality of live SM broadcast objects.

14. The method of claim 1, wherein said pre-configured PH buffer and said allocated PH buffer are maintained in the memory of said one of said plurality of HSs as a sliding window by replacing currently stored data packets of said one of said plurality of live SM objects with data packets representing successive portions of said one of said plurality of live SM objects.

15. In a network having a content server which hosts a plurality of live streaming multimedia (SM) broadcast objects for distribution over said network through a plurality of helper servers (HSs) to a plurality of clients, a method of reducing start-up latency associated with distributing said plurality of live SM broadcast objects from said content server and said plurality of HSs to said plurality of clients, said method comprising:

receiving a request from one of said plurality of clients for one of said plurality of live SM broadcast objects at one of said plurality of HSs;

determining whether said request can be partially serviced from a pre-configured playout history (PH) buffer allocated in a memory associated with said one of said plurality of IHSs;

partially servicing said request from said pre-configured PH buffer at a first data rate, if said determining step is satisfied, the first data rate being higher than a standard data rate associated with servicing said request from a non pre-configured PH buffer; and allocating the non pre-configured PH buffer in said memory to partially service said request at said standard data rate, if said determining step is not satisfied.

16. The method according to claim 15, further comprising the step of maintaining a playout history associated with one of said plurality of live SM broadcast objects for said pre-configured PH buffer, wherein said playout history substantially comprises the last few seconds of one of said plurality of live SM broadcast objects.

17. The method according to claim 15, wherein said allocated non pre-configured PH buffer is de-allocated from said memory, upon determining:
a) said request has been terminated or completed; and
b) there are no further requests being received at said one of said plurality of HSs to be serviced from said allocated non pre-configured PH buffer.

18. The method according to claim 15, wherein the allocating step further includes the step of determining whether there is a sufficient amount of memory available in said memory to be allocated to said non pre-configured PH buffer.

19. The method according to claim 18, wherein said request is serviced from said one of said plurality of HSs at said standard data rate when it is determined that there is an insufficient amount of memory available to allocate said non pre-configured PH buffer.

20. In a network having a content server which hosts a plurality of live streaming multimedia (SM) broadcast objects for distribution over said network through a plurality of helper servers (HSs) to a plurality of clients, a method of reducing start-up latency associated with distributing said plurality of live SM broadcast objects from said content server and said plurality of HSs to said plurality of clients, said method comprising:

receiving a request from one of said plurality of clients for one of said plurality of live SM broadcast objects at one of said plurality of Hss;

determining whether said request can be partially serviced at a first data rate from a pre-configured playout history (PH) buffer allocated in a memory associated with said one of said plurality of HSs, the first data rate being higher than a standard data rate associated with servicing the request from a non pre-configured PH buffer; and allocating the non pre-configured PH buffer, in said memory to partially service said request at said standard data rate, if said determining step is not satisfied.

21. The method according to claim 20, wherein if said (deter mining step is satisfied, servicing said request from said pre-configured PH buffer at said first data rate.

22. The method according to claim 20, wherein said pre-configured PH buffer is allocated in said memory at a configuration stage.

23. The method according to claim 20, wherein said pre-configured PH buffer is permanently maintained in said memory.

24. The method according to claim 20, wherein the allocating step further comprises the step of distributing data packets stored in said pre-configured PH buffer to said one of said plurality of clients, wherein said data packets make up said one of said plurality of live SM broadcast objects.

25. The method according to claim 20, wherein the allocating step further includes the step of determining whether there is a sufficient amount of memory available in said memory to be allocated to said non pre-configured PH buffer.

26. The method according to claim 20, wherein said request is serviced from said one of said plurality of HSs at the standard data rate when it is determined that there is an insufficient amount of memory available to allocate said non pre-configured PH buffer.

27. In a network having a content server which hosts a plurality of live streaming multimedia (SM) broadcast objects for distribution over said network through a plurality of helper servers (HSs) to a plurality of clients, a method of reducing start-up latency associated with distributing said plurality of live SM broadcast objects from said content server and said plurality of HSs to said plurality of clients, said method comprising:

receiving a first request for one of said plurality of live SM broadcast objects at one of said plurality of HSs;

servicing said first request from a non pre-configured playout history (PH) buffer at a first data rate;

receiving a second request for said one of said plurality of live SM broadcast objects at said one of said plurality of HSs; and partially servicing said second request from said non pre-configured PH buffer at a second data rate, wherein said second data rate is higher than said first data rate.

28. The method of claim 27 further comprising the step of servicing said first request without pre-storing packets associated with requested live SM broadcast in said non pre-configured PH buffer, if said determining step is not satisfied.

29. The method according to claim 27, wherein the step of servicing said first request further includes the step of determining whether there is a sufficient amount of memory available in said memory to be allocated to said non pre-configured PH buffer.

* * * * *